INVENTOR
J. M. KELLY
BY *[signature]*
ATTORNEY

Sept. 24, 1968 J. M. KELLY 3,403,343

HARMONIC GENERATOR

Filed Feb. 17, 1966 3 Sheets-Sheet 3

United States Patent Office 3,403,343
Patented Sept. 24, 1968

3,403,343
HARMONIC GENERATOR

James M. Kelly, Morris Plains, N.J., assignor to Bell Telephone Laboratories, Incorporated, New York, N.Y., a corporation of New York Filed Feb. 17, 1966, Ser. No. 528,180
9 Claims. (Cl. 328—17)

This invention relates to the generation of harmonically related signals and in particular to the generation of harmonically related signals whose amplitudes are independent of frequency.

In the processing of communication signals, it is frequently advantageous to employ one or more harmonics of a signal. For example, in vocoder systems, excitation for the synthesis of a speech signal is generally developed from a nearly sinusoidal signal which denotes the momentary pitch of the speech. Typically, a number of harmonics are derived from a "pitch" signal by means of numerous banks of filters, amplifiers, equalizers and the like, and are processed to form the necessary excitation. Unfortunately, the amplitudes of harmonic signals derived in this fashion decrease rapidly with increasing frequency, so that only the first few harmonic signals, at most, contain sufficient energy for use. Moreover, harmonic generators of this sort yield satisfactory results only so long as the frequency of the fundamental remains substantially a constant.

To overcome these deficiencies, this invention approaches the problem of generating harmonics on a digital rather than on an analog basis. In particular, this invention makes use of the fact that an analog signal can be constructed from a sequence of artifically generated samples. Briefly, selected sine wave values, representing one complete cycle of a reference sine wave, are derived, for example, from a table of natural trigonometric functions and stored in coded form in a memory unit. Selected harmonically related sine wave signals are generated by nondestructively reading out selected sequences of sine wave values from the memory unit in a prescribed order and at a prescribed rate. In accordance with the well known sampling theorem, the sequential readout of all the samples of the sine wave cycle in a time interval equivalent to the period of the desired fundamental frequency, followed by suitable filtering, produces a smooth sinusoidal wave with the desired fundamental frequency. The second harmonic of the fundamental frequency is produced, in accordance with the invention, by nondestructively reading out selected stored samples in a time interval equal to one-half of that alloted to the fundamental period. Similarly, the $n$th harmonic of the fundamental frequency is produced by reading out selected samples in one-$n$th the fundamental period.

In accordance with a feature of the invention, higher order harmonics are generated with fewer samples per period than the lower order harmonics. This may be done because a sine wave can be constructed from as few as two uniformly spaced samples per period. Thus, for the generation of the second harmonic, every second sample may be read out at the same rate as used for reading out samples to generate the fundamental. The $n$th harmonic may be generated by reading out every $n$th sample at the same rate used for the readout of samples to generate the fundamental.

Since all the harmonics are generated from sequences of the same reference sine wave values, all harmonics are of equal amplitude. Moreover, the fundamental frequency of the resulting $n$ harmonics can be varied continuously as a function of time, thus making the harmonic signals useful in the synthesis of a replica of speech possessing a continuously varying pitch frequency.

This invention will be more fully understood from the following detailed description of an illustrative embodiment thereof taken in connection with the appended drawings in which.

Figure 1:
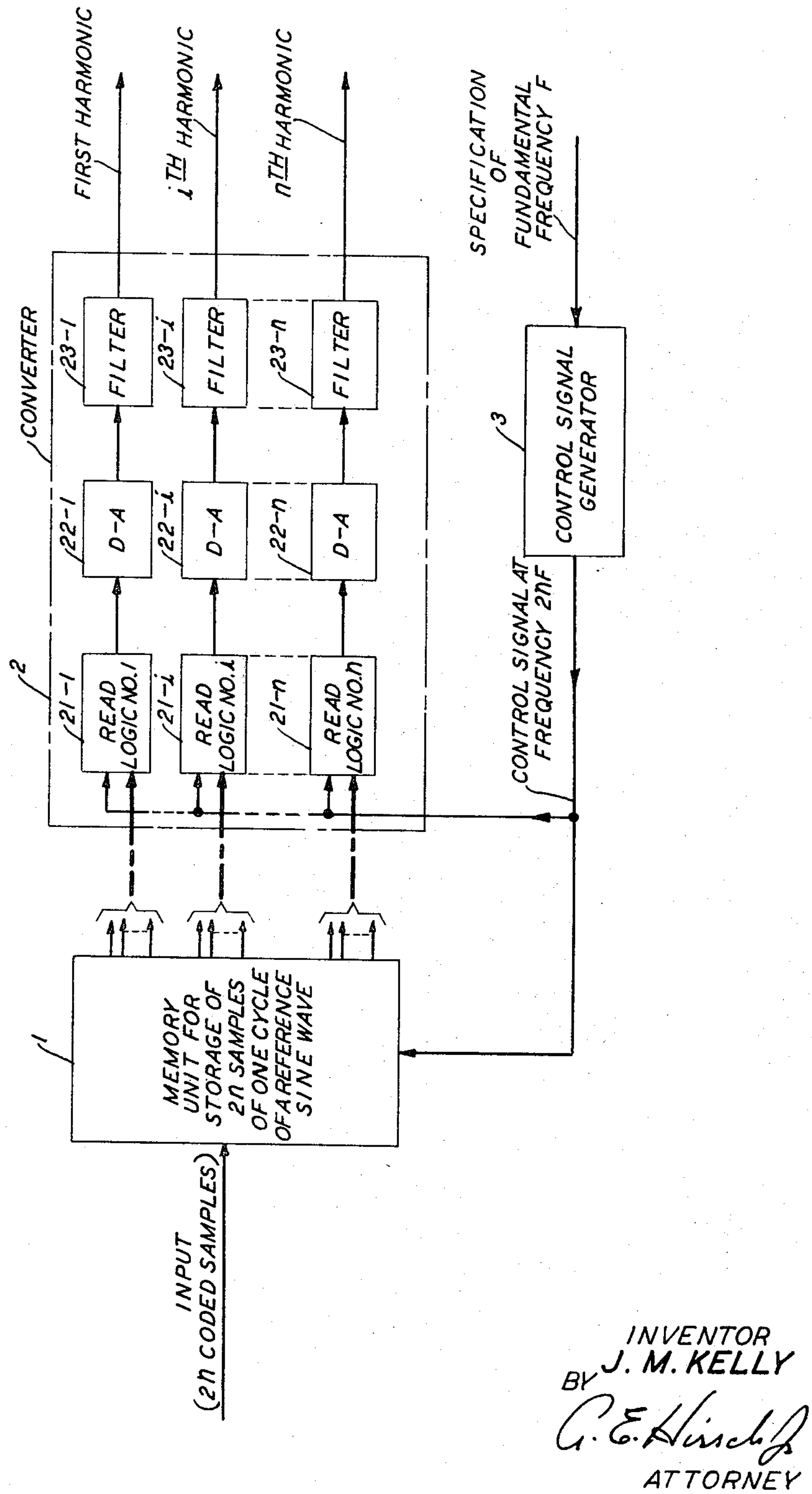
FIG. 1 is a schematic block diagram of a preferred embodiment of this invention.

A preferred embodiment of the invention is shown in FIG. 1. Uniformly spaced samples of one cycle of a reference sine wave are stored at discrete addresses in memory 1. These samples may be derived, for example, from a table of natural trigonometric functions and converted to coded form prior to storage, using any well known technique. Sequences of the stored samples are thereafter nondestructively and simultaneously read out of memory 1 in order to produce equal amplitude harmonics of a fundamental frequency F. The rate at which sequences of samples of the reference sine wave are read out is determined by a control signal from generator 3. The control signal is characterized by a frequency equal to $2n$ times the fundamental frequency F of the harmonics to be generated. Thus, $n$ sequences of coded sine wave samples are simultaneously transformed by converter 2 to $n$ equal amplitude harmonics with a fundamental frequency F equal to that specified by the control signal. The fundamental frequency F can, in general, vary as a function of time.

Memory 1 contains $2n$ code words each of which represents a selected sample from one cycle of a reference sine wave. Each code word may contain as many digits as desired; ordinarily the length of the code word is determined by the capacity of the memory unit. Each binary code word is nondestructively read out of the memory in response to the control signal from generator 3 at a rate of $2n$F cycles per second. The read function is carried out by energizing selected read-logic elements 21 in converter 2, and in memory 1. In accordance with the invention, all of the read-logic elements are enabled together to read out simultaneously the binary code words, representing $n$ selected sequences of sine wave samples.

For example, to generate the first harmonic or fundamental frequency F, read-logic element 21–1 is energized by the control signal to read out in sequence, at a rate of $2n$F cycles per second, all of the binary code words representing all the sine wave samples. These binary code words are converted to analog samples in digital-to-analog converter 22–1 and the sequence of analog sine wave samples so generated is passed through filter 23–1, thereby to generate a smooth wave. Since $2n$ samples of the sine wave are stored in memory 1 and since read-logic elements 21 are driven to read out the stored sine wave samples at a rate of $2n$F samples per second, all $2n$ stored samples of the sine wave are read out by element 21–1 in one cycle of the fundamental frequency F. Thus, the tandemly-connected element 21–1, converter 22–1, and filter 23–1 generate a replica of the first harmonic or fundamental frequency.

The $i$th harmonic is generated by tandemly-connected element 21–$i$, converter 22–$i$, and filter 23–$i$, where $i$ is an integer given by the relation $1 \leq i \leq n$. Element 21–$i$ is likewise driven at a rate of $2n$F cycles per second by the control signal from generator 3. However, element 21–$i$ reads out sequentially the binary code words representing every $i$th stored sine wave sample rather than all the stored sine wave samples. Since element 21–$i$ is driven at the same rate as element 21–1, element **21–*i*** reads out every *i*th stored sample *i* times per fundamental period. The binary code words read out of memory 1 by element **21–*i* are converted to analog form by converter 22–*i* and then passed through the corresponding filter 23–*i*** to generate a replica of the *i*th harmonic of the fundamental frequency F. Because the samples used to generate this *i*th harmonic are selected from the same samples used to generate the fundamental frequency or first harmonic, the *i*th harmonic has the same amplitude as the first harmonic.

If the integer *i* is not divisible into $2n$ an integral number of times, the last sample read out of memory 1 by element **21–*i*** in one sweep through the memory, i.e., in sequentially reading out the stored samples for a complete period, is not necessarily the last stored sample. The remaining samples, which of course total less than *i*, are counted, for example, in read-logic element **21–*i*, and form the initial count when element 21–*i* begins the next sweep through memory 1** for the next complete period. Thus, if there are *m* samples remaining in memory 1 beyond the last sample read out in a given sweep, the first sample read out of memory 1 at the beginning of the next sweep is the $(i-m)$th sample, where *m* is a positive integer less than *i*.

Memory units, interrogating circuitry, and digital-to-analog converters similar to memory 1, read-logic elements 21, and converters 22 are well known in the digital computer arts and thus will not be described in detail.

The number of harmonics which can be generated in this manner is limited by the sampling theorem to one-half the number of samples stored in memory 1, or $2n/2=n$. The sampling theorem states that information contained in an analog signal will not be lost if the sampling frequency is at least twice the frequency of the highest information bearing frequency component in the analog signal. Consequently, if the sampling frequency is $2nF$, the highest possible undistorted frequency component of the replica signal will have a frequency $n$F. Accordingly, only $n$ harmonics, at most, can be generated from $2n$ samples of one cycle of a sine wave.

Filters 23 can be either low-pass or bandpass because of the uniqueness of the frequency spectrum of a sine wave. The frequency spectrum of an unsampled sine wave consists of two lines at symmetrical positive and negative frequencies centered about zero frequency. However, the frequency spectrum of a series of uniformly spaced samples of a sine wave includes an unsampled sine wave spectrum plus a series of line spectra, each centered about an integral multiple of the sampling frequency. The process of regenerating the original sine wave from the series of sine wave samples requires separating or filtering the frequency spectrum of the unsampled sine wave from the replica spectra generated by the sampling process. This filtering can be done either by a low-pass filter with a cutoff frequency above the original sine wave frequency but below the frequency of the first replica spectrum, or by a bandpass filter centered at the frequency of the unsampled sine wave. If desired, the cutoff frequencies of the low-pass filters or the center frequencies of the bandpass filters can be varied in response to changes in the fundamental frequency F, which, in general, can vary with time.

The control signal at frequency $2n$F used to control the readout rate of samples from memory 1 is derived in control signal generator 3. Generator 3 can, in general, be driven either by an analog signal at the fundamental frequency F of the harmonics to be generated or by a digital signal representing the desired fundamental frequency F in coded form.

Figure 2:
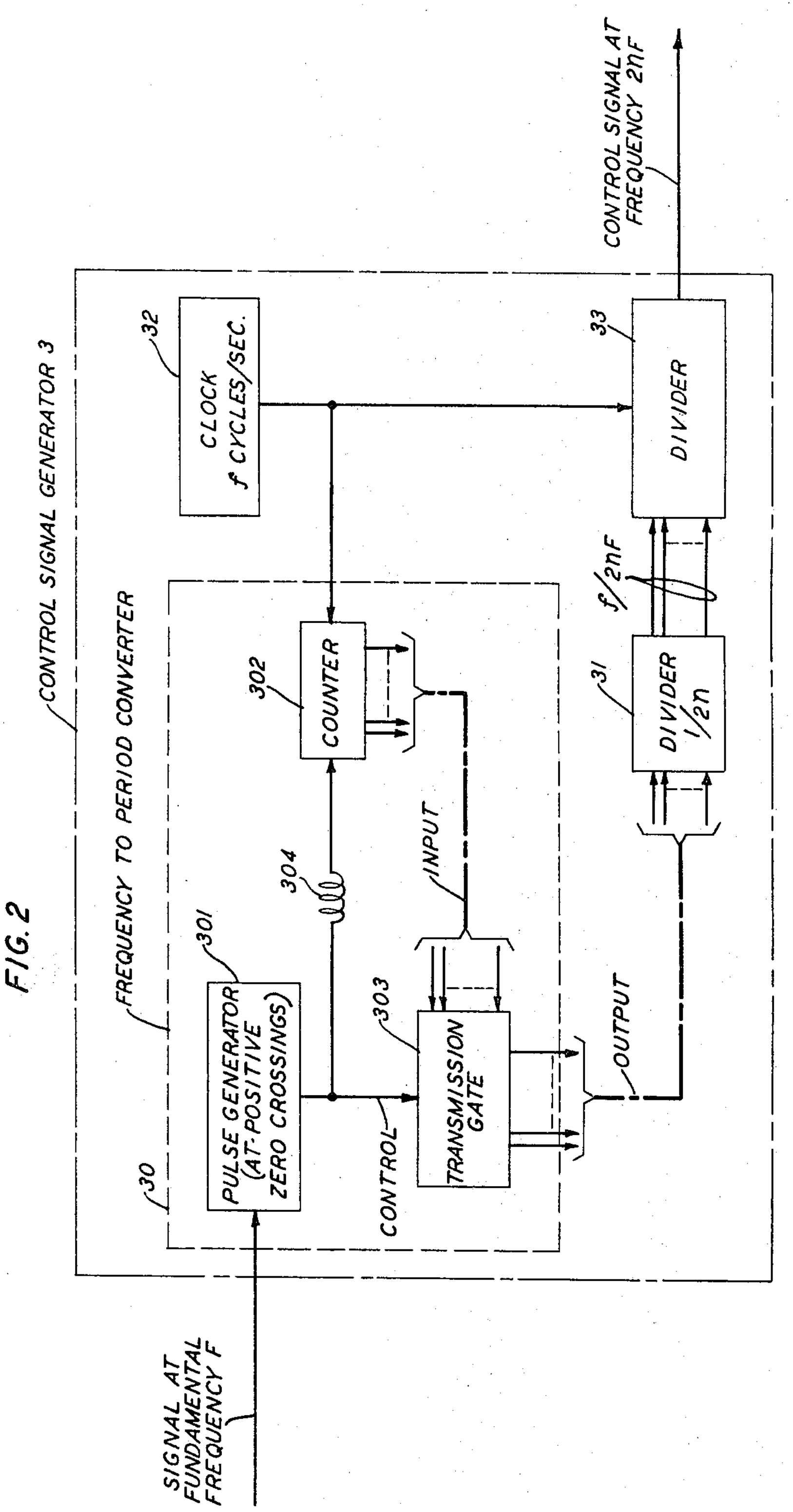
FIG. 2 is a schematic block diagram of one embodiment of the control signal generator shown in FIG. 1.

FIG. 2 shows one embodiment of a suitable generator. In the figure, a signal proportional to the fundamental period $1/F$ of an analog signal possessing a selected fundamental frequency F is obtained by means of frequency-to-period converter 30. In converter 30, pulse generator 301 generates a pulse at each positive zero crossing of the applied signal at frequency F. Simultaneously, counter 302 is driven by clock 32 at constant frequency $f$, preferably of one megacycle or more, so that $f \gg F$. Counter 302 is reset to zero each time pulse generator 301 generates a pulse. However, the reset pulse is delayed in delay 304 by the time necessary to first read out the count accumulated in counter 302. Just prior to reset, the instantaneous count in counter 302, equal to $f/F$, is transmitted as a binary code word through transmission gate 303 to divider 31. Gate 303 is opened momentarily by the pulse from generator 301.

The frequency $f$ of clock 32 is determined by the time units selected for the output signal from converter 30. If, for example, the output signal from converter 30 is made proportional to time in milliseconds, the frequency of the output signal from clock 32 must be one kilocycle. In this embodiment, the signal from converter 30 is proportional to time in microseconds; thus, the frequency of the signal from clock 32 is one megacycle. Of course, any other desired clock frequency could be utilized depending on the fundamental frequency of the harmonics to be generated.

The output signal from converter 30, a binary code word equal to $f/F$, is divided by $2n$ in divider 31, where $n$ is a positive integer equal to the number of harmonics which it is desired to generate. Because $f \gg F$, the quantizing error associated with the division in divider 31 is negligibly small. Digital devices capable of binary division, or the equivalent, are well known in the digital equipment art; divider 31 will thus not be described in detail.

Figure 3:
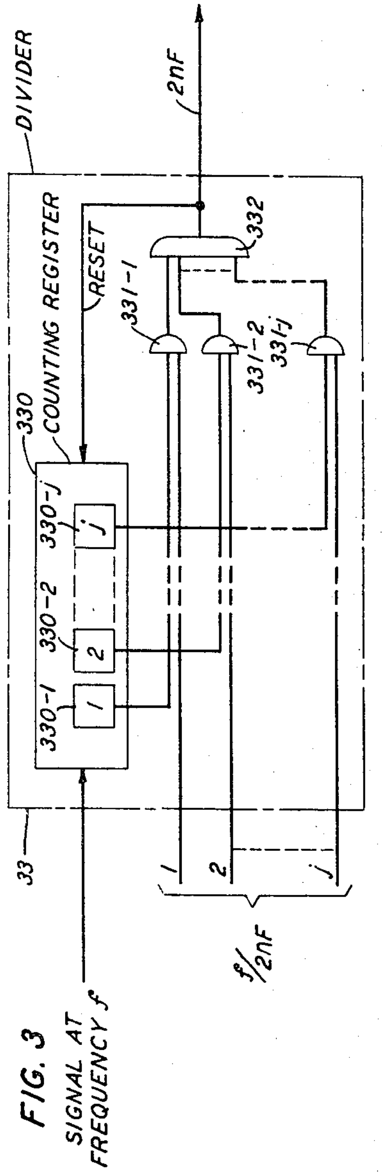
FIG. 3 is a schematic block diagram of one embodiment of divider 33 shown in FIG. 2.

The output signal from divider 31 is the binary coded equivalent of $f/2nF$. It is sent in coded form to divider 33 where it is used to divide a signal at frequency $f$ to generate a control signal at a frequency of $2n$F. FIG. 3 shows one embodiment of divider 33. The output signal at a frequency $f$ from clock 32 in FIG. 2 enters counting register 330, which consists of $j$ serially-connected binary counting units 330–1 through **330–*j*. The integer $j$ is the maximum number of binary digits in the code word generated in counting register 330 to represent the number of cycles of frequency $f$ counted in divider 33. The voltage level of each counting unit 330 is continuously applied to a corresponding AND gate 331. Each AND gate 331 also receives an input signal representing the voltage level of a corresponding digit in the binary code word $f/2nF$. When the voltages on the two inputs to an AND gate 331 are equal, the AND gate emits a pulse which is applied to a second AND gate 332. AND gate 332 emits a pulse only when all AND gates 331 simultaneously generate pulses. Thus, AND gate 332 emits a pulse only when the count in register 330 equals the binary code word representing $f/2nF$. The frequency of output pulses from AND gate 332 is $2n$F. Each pulse from AND gate 332 is also used to reset counting register 330** to its initial condition in preparation for another counting cycle.

Control signal generator 3 of FIG. 1, if desired, can include a digital computer to provide a sequence of binary code words equal to $2n$F in response to an input binary code word equal to F or in response to a programed schedule of time variations in fundamental frequency. In this case, circuitry similar to that shown in FIG. 4 may be used to convert the code word from the computer into a control signal with a frequency $2n$F.

Figure 4:
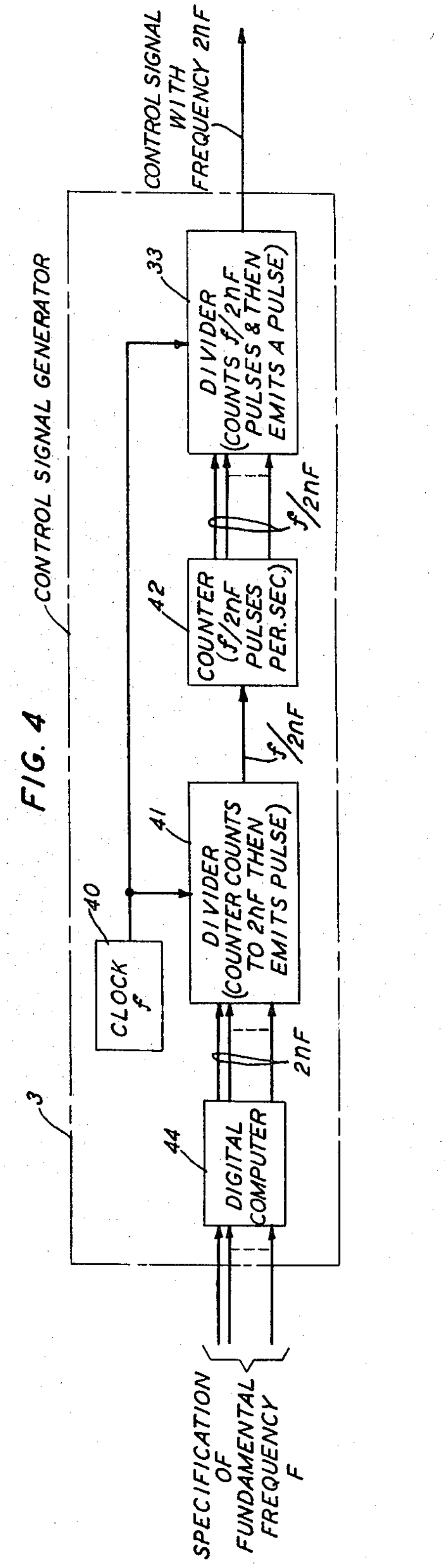
FIG. 4 is a block diagram of a control signal generator utilizing a digital computer.

In FIG. 4, clock 40 produces an output signal at a frequency $f$. This signal is delivered to divider 41 which emits a pulse every $2n$F cycles of this signal, where $2n$F is a binary code word supplied by computer 44. Divider 41 which functions in a manner similar to divider 33 shown in FIG. 3, emits pulses at a frequency equal to $f/2nF$ cycles per second. These pulses are applied to counter 42 which sums the number of pulses applied to it in one second, or any other selected interval of time. Counter 42 produces a binary coded output signal equal to $f/2nF$ which is applied to previously described divider 33. Divider 33 is driven by clock 40 at frequency $f$ and produces output pulses at a frequency $2nF$ cycles per second which are used to control the readout rate of the sine wave samples stored in memory 1, shown in FIG. 1.

Other embodiments of this invention will become obvious to those skilled in the digital equipment art. It should be recognized that the number of harmonics of a selected fundamental frequency which can be generated is limited only by the number of reference sine wave samples which can be stored in a memory and by the limitations on the rate at which the samples stored in memory can be read out and converted from digital to analog form.

What is claimed is:

1. Apparatus which comprises
- means for storing $2n$ samples of one cycle of a reference sine wave where $n$ is a selected positive integer;
- means for generating a signal with a frequency $2n$ times a selected fundamental frequency $F(t)$;
- means driven by said signal for sequentially reading out of said storing means every $i$th stored sample at a frequency of $2nF$ cycles per second, where $i$ is an integer given by $1 \leq i \leq n$; and
- means for converting the $i$th sequence of samples into the $i$th harmonic of said selected fundamental frequency $F(t)$.

2. Apparatus for generating $n$ harmonics of a selected frequency F where $n$ is a positive integer, which comprises
- storage means for storing $2n$ samples of sine wave values within the interval from zero to $2\pi$;
- a plurality of $n$ readout means, $1, 2, \ldots, i, \ldots n$, for simultaneously reading out of said storage means $n$ selected sequences of said $2n$ samples, wherein said $i$th readout means reads out every $i$th of said $2n$ samples at a rate of $2nF$ samples per second; and
- a plurality of $n$ converting means connected on a one-to-one basis to said readout means for simultaneously converting said $n$ selected sequences of samples to $n$ harmonics of said selected frequency F.

3. In combination,
- means for converting a signal at a frequency F into a control signal at a frequency $2nF$, where $n$ is a selected positive integer;
- means for storing $2n$ coded samples of one cycle of a reference sine wave;
- means controlled by said control signal for simultaneously reading out of said storing means $n$ selected sequences of coded samples; and
- means for simultaneously converting said $n$ selected sequences of coded samples into the first $n$ harmonics of said frequency F.

4. Apparatus as defined in claim 3 in which said means for converting a signal at a frequency F into a control signal at a frequency $2nF$ comprises
- means for producing an output signal at a constant frequency $f$;
- means for obtaining from said signal at a frequency F and said output signal a third signal equal to $f/F$;
- means for obtaining from said third signal a fourth signal equal to $f/2nF$; and
- means for dividing the frequency $f$ of said output signal by said fourth signal thereby generating said control signal at a frequency $2nF$.

5. Apparatus as in claim 4 wherein said means for dividing the frequency $f$ of said output signal by said fourth signal comprises
- a binary counting register driven by said output signal and containing $j$ series-connected counting units, where $j$ is a positive integer equal to the maximum number of binary digits in the binary code word generated in said counting register by said output signal;
- a plurality of $j$ AND gates each containing two input and one output leads, and each being connected by one of said input leads to a corresponding one of said counting units, each of said $j$ AND gates being designed to emit an output pulse in response to two identical input voltages;
- a plurality of $j$ input lines connected on a one-to-one basis to the other input leads of said AND gates, each of said input lines carrying one digit of the $j$-digit binary-coded equivalent of said fourth signal; and
- an AND gate connected to said output leads from said plurality of $j$ AND gates, said AND gate being designed to emit an output pulse in response to simultaneous output pulses from each of said plurality of $j$ AND gates.

6. Apparatus as in claim 4 in which said means for obtaining from said signal at a frequency F and said output signal a third signal equal to $f/F$ comprises
- means for generating a pulse at each positive zero crossing of said signal at a frequency F;
- means for counting the number of cycles of said output signal between two consecutive positive zero crossings of said signal at a frequency F, the resulting count being equal to $f/F$; and
- means, controlled by the pulses from said generating means, for transmitting a signal equal to $f/F$ from said counting means at each positive zero crossing of said signal at a frequency F.

7. Apparatus as in claim 3 in which said means controlled by said control signal comprises
- $n$ parallel-connected elements for simultaneously reading out of said storing means $n$ selected sequences of code words representing $n$ selected sequences of reference sine wave values.

8. Apparatus as in claim 3 in which said means for simultaneously converting said $n$ selected sequences of coded samples into the first $n$ harmonics of said frequency F comprises
- $n$ parallel-connected digital-to-analog converters for converting said $n$ selected sequences of coded samples into $n$ corresponding sequences of analog sine wave samples; and
- $n$ filters connected on a one-to-one basis to said $n$ digital-to-analog converters, each of said filters being designed to separate the spectrum of a corresponding harmonic from the replica spectra generated by the sampling process.

9. Apparatus as in claim 3 in which said means for converting a signal at a frequency F into a control signal at a frequency $2nF$ comprises
- a digital computer for converting code words representing said fundamental frequency F into second code words representing the number $2nF$;
- a clock which produces an output signal at a frequency $f$, where $f$ is larger than F;
- first counting means controlled by said second code words and driven by said output signal for emitting one pulse every $2nF$ cycles of said output signal;
- second counting means driven by the pulses from said first counting means for producing a coded signal equal to $f/2nF$, the number of pulses per second emitted by said first counting means; and
- third counting means driven by said output signal and controlled by said coded signal equal to $f/2nF$ for emitting an output pulse every $f/2nF$ cycles of said output signal, a sequence of said output pulses constituting said control signal at a frequency $2nF$.

No references cited.

ARTHUR GAUSS, *Primary Examiner.*

J. ZAZWORSKY, *Assistant Examiner.*